United States Patent [19]

Wilhelm

[11] Patent Number: 4,559,924
[45] Date of Patent: Dec. 24, 1985

[54] THIN FILM ABSORBER FOR A SOLAR COLLECTOR

[75] Inventor: William G. Wilhelm, Cutchogue, N.Y.

[73] Assignee: The United States of America as represented by the United States Department of Energy, Washington, D.C.

[21] Appl. No.: 582,163

[22] Filed: Feb. 27, 1984

Related U.S. Application Data

[63] Continuation of Ser. No. 347,215, Feb. 9, 1982, abandoned, which is a continuation-in-part of Ser. No. 96,260, Nov. 20, 1979, Pat. No. 4,327,707.

[51] Int. Cl.$^4$ ............................................... F24J 3/02
[52] U.S. Cl. ..................................... 126/426; 126/444; 126/450
[58] Field of Search ............... 126/426, 444, 450, 449, 126/445, 901, 432, 447

[56] References Cited

U.S. PATENT DOCUMENTS

| | | | |
|---|---|---|---|
| 3,174,915 | 3/1965 | Edlin | 126/426 |
| 3,991,742 | 11/1976 | Gerber | 126/416 |
| 4,036,209 | 7/1977 | Press | 126/426 |
| 4,038,967 | 8/1977 | Stout | 126/426 |
| 4,191,169 | 3/1980 | Hyman | 126/447 |
| 4,221,210 | 9/1980 | Cvijanovich | 126/445 |

OTHER PUBLICATIONS

E. V. Nelson et al, Dev. of a Low-Cost Solar Panel Using Laminated Polymer Films, Jan. 1979.

Primary Examiner—William E. Lyddane
Assistant Examiner—Gerald A. Anderson
Attorney, Agent, or Firm—Vale P. Myles; Hugh W. Glenn; Judson R. Hightower

[57] ABSTRACT

This invention pertains to energy absorbers for solar collectors, and more particularly to high performance thin film absorbers. The solar collectors comprising the absorber of this invention overcome several problems seen in current systems, such as excessive hardware, high cost and unreliability. In the preferred form, the apparatus features a substantially rigid planar frame with a thin film window bonded to one planar side of the frame. An absorber in accordance with the present invention is comprised of two thin film layers that are sealed perimetrically. In a preferred embodiment, thin film layers are formed from a metal/plastic laminate. The layers define a fluid-tight planar envelope of large surface area to volume through which a heat transfer fluid flows. The absorber is bonded to the other planar side of the frame. The thin film construction of the absorber assures substantially full envelope wetting and thus good efficiency. The window and absorber films stress the frame adding to the overall strength of the collector.

4 Claims, 15 Drawing Figures

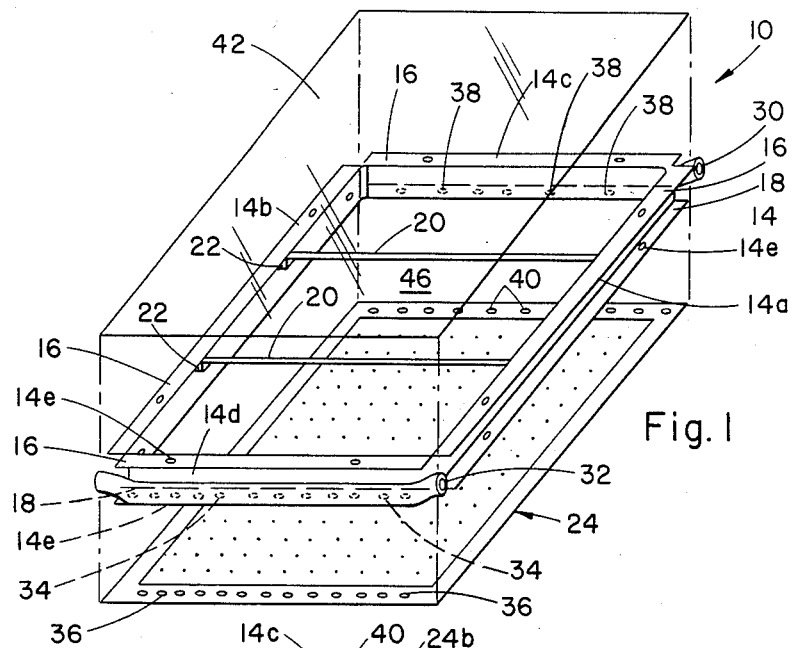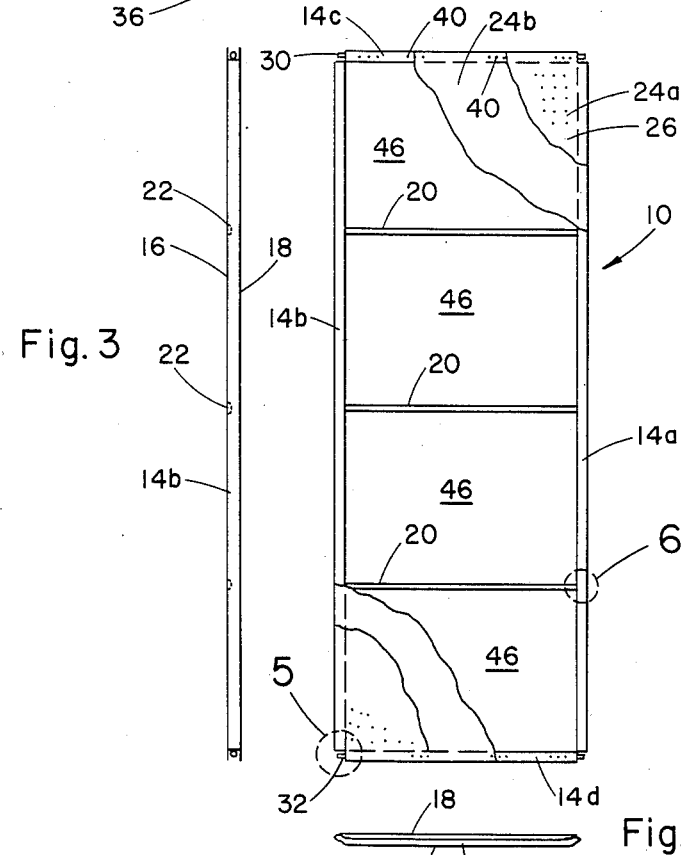

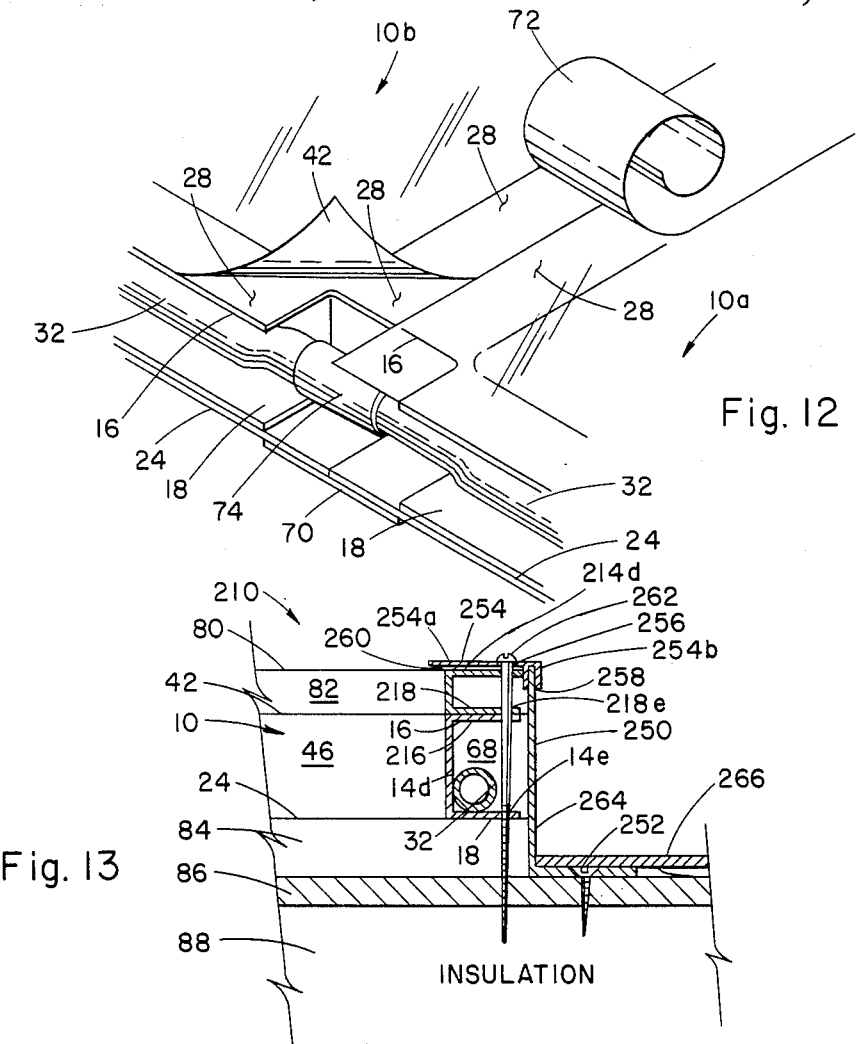
Fig. 12
Fig. 13
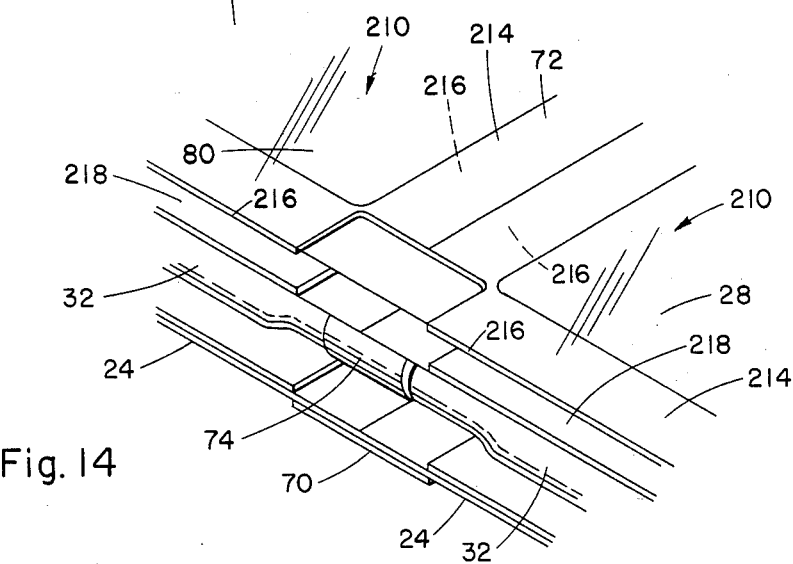
Fig. 14

THIN FILM ABSORBER FOR A SOLAR COLLECTOR

BACKGROUND OF THE INVENTION

The U.S. Government has rights in this invention pursuant to Contract Number DE-AC02-76CH00016, between the U. S. Department of Energy and Associated Universities, Inc.

This application is a continuation of Ser. No. 347,215 filed Feb. 9, 1982, now abandoned, which is a Continuation-In-Part of application Ser. No. 96,260, filed Nov. 20, 1979, now U.S. Pat. No. 4,327,707.

This invention relates to a solar collector, and more particularly to a flat plate energy absorber, for use in such collector, that uses thin films and is of simplified design.

There are a myriad of solar energy absorbers and collectors available. Generally, absorbers heretofore tend to be complicated and labor intensive. The simplest of these systems employ involved plumbing schemes and absorber hardware that make even the "low cost" versions relatively expensive. Then, too, the overly complicated nature of prior apparatus reduces system reliability and detracts from system efficiency.

Collectors comprising absorbers in accordance with the present invention depart from standard practice and utilize high performance, low cost, thin films for the window of the collector and for the absorber. The thin films are bonded to the collector, or panel, in a stressed state and thus add to the overall strength of the panel. In general, the collectors comprising the absorbers of the present invention comprise a rigid perimetric planar frame of light weight construction. The thin film, high strength plastic window or glazing is stretched across and bonded to one planar side of the frame. A thin film absorber, in accordance with the present invention, of laminate construction, defines a fluid-tight planar envelope through which a heat transfer fluid flows. The absorber is stretched across and bonded to the other planar side of the frame. The frame is thus stressed by the thin films on both planar sides yielding a panel of light weight monocoque construction that exhibits high strength. In the preferred structure, the absorber comprises two thin films that are perimetrically sealed, having a high surface area to volume ratio.

Means, in the form of a plurality of spot-welds or spot-bonds, may be applied across the planar face of the absorber laminate for dimensional stability. By means of simplified input and output piping, the heat transfer fluid is admitted to and extracted from the absorber. In the preferred structure, the rigid members that comprise the frame are each, in transverse cross-section, defined by opposed, outwardly directed perimetric parallel flats. These flats provide a planar perimetric surface onto which the glazing and absorber bond. For added capacity, individual panels are readily joined in planar array by such means as contact bonding of adjacent planar perimetric flats. When the panels are so joined, the individual strength of a given panel enhances the overall strength of the array. The structural configuration of the frame readily accomodates the relative thermal expansion and contraction of adjacent panels thus minimizing structural fatigue.

It is, therefore, an object of the present invention to provide an absorber for a low cost solar collector that is of simplified design.

It is a futher object of the present invention to provide a solar collector having a low cost, high strength absorber having good heat transfer to the fluid flowing through it.

Other objects and features of the present invention will become apparent from the following detailed description considered in connection with the accompanying drawings. It is to be understood, however, that the drawings are designed for purposes of illustration only, and not as a definition of the limits of the invention for which reference should be made to the appending claims.

BRIEF DESCRIPTION OF THE DRAWINGS

In the drawings, wherein the same reference numeral denotes the same element throughout the several views:

FIG. 1 is an exploded perspective view of a solar collector according to the present invention showing the planar construction of the thin film glazing and thin film absorber;

FIG. 2 is a plan view of the solar collector shown in FIG. 1 with portions broken away for clarity;

FIG. 3 is a side elevational view of the structure shown in FIG. 2;

FIG. 4 is a front elevational view of the structure shown in FIG. 2;

FIG. 12 is a fragmentary perspective view drawn on an enlarged scale showing that portion indicated as 11 in FIG. 10, with parts peeled back for clarity to reveal the construction of a typical joint adjacent panels;

FIG. 13 is a fragmentary sectional view drawn on an enlarged scale showing another embodiment of the collector according to the present invention and the manner of mounting same to a roof; and FIG. 14 is a fragmentary perspective view drawn on an enlarged scale showing a typical joint between adjacent panels, the panels are of the construction shown in FIG. 13.

DETAILED DESCRIPTION OF THE INVENTION

Figure 5:
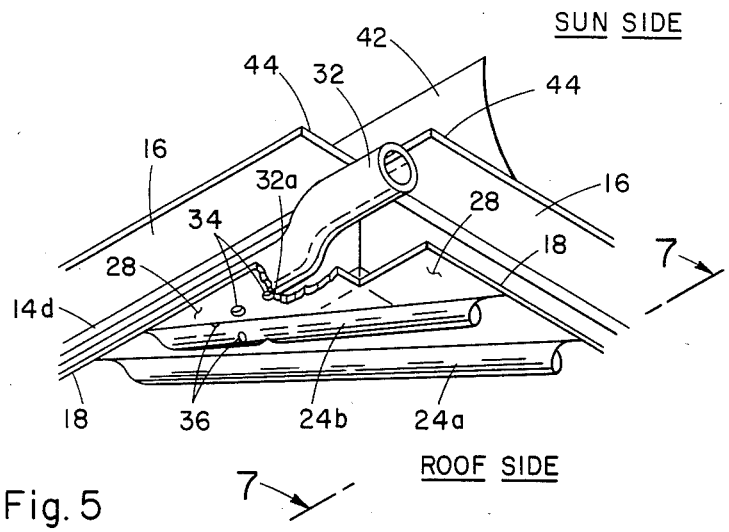
FIG. 5 is a fragmentary perspective view drawn on an enlarged scale showing that portion indicated as 5 in FIG. 2 to reveal in detail the laminate construction of the thin film absorber, the thin film structure of the glazing, and the construction of the outlet manifolding.
Figure 6:
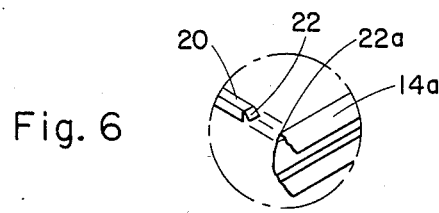
FIG. 6 is a fragmentary perspective view drawn on an enlarged scale showing that portion indicated as 6 in FIG. 5 to reveal in detail a cross-piece added to the frame for rigidity.

More particularly now and referring to the drawings, FIGS. 1 through 9 show the flat plate, thin film solar collector comprising the thin film absorber of the present invention with same being indicated generally by reference numeral 10. The collector is defined by a substantially planar rigid perimetric frame 14, that, in plan view, is preferably rectangular. Frame 14 is comprised of spaced parallel confronting side members 14a and 14b, and 14c and 14d. As seen best in FIG. 1, each member 14a, 14b 14c, and 14d is, in transverse cross-section, U-channeled or U-shaped and, as such, is defined by respective outwardly projecting parallel spaced flats or flanges 16 and 18. Frame 14 can be fabricated from either light-gauge metal, such as galvanized steel or aluminum, or the frame can be comprised of plastic or nylon, or some such synthetic. Indeed, frame 14 might be fabricated from wood or hardboard stock, or the frame can be fabricated from a composite of these materials such as plastic and metal. In actual construction, frame 14 can be bent into its preferably rectangular shape from single stock, or, the frame can be fabricated from discrete members bonded or jointed into this rectangular configuration.

For added rigidity, frame 14 is braced with one or a plurality of cross-pieces 20. Each cross-piece 20 includes a frame-fitting locking tang 22 that fits into a complementary receiving slot 22a as shown, for example, in FIG. 6, in frame sides 14a and 14b. And, to facilitate on-site mounting of the collector, frame 14 includes a plurality of mounting holes 14e disposed through flats 16 and 18.

A thin film absorber 24 is sized complementary to the included planar area presented by the perimeter of frame 14, or, more precisely, flats 18. Absorber 24 is of laminate construction and as such is comprised of thin film planar layers 24a and 24b, as shown, for example, in FIG. 2, each having a nominal thickness of 0.003 inches (0.01 cm). Each thin film layer 24a and 24b may be fabricated from thin film plastic stock such as polypropylene, polyfluoride, or polyester, and, therefore, is capable of withstanding temperatures of up to 400° F. under stagnant conditions. In certain applications, and for increased efficiency, absorber 24 can be comprised of a laminate of thin films that further enhance thermodynamic efficiency. For example, enhanced operation can be obtained by fabricating absorber layer 24b, the layer that immediately faces the sun, from high performance polypropylene or polyester owing to the improved ultraviolet absorptivity of these materials. Absorber layer 24a can be fabricated from polyester, owing to the strength of this material.

Another high performance material, polytetrafluoroethylene (known under the Trademark Teflon) may be used in absorber 24 if coated so as to increase absorptivity. Preferably such coating would be selective, i.e. having good absorptivity in the visual region of the spectrum while having low emissivity in the infra-red region. The use of polytetrafluoroethylene may allow stagnation temperatures as high as about 400° F.

Then, too, under stagnant worst case conditions, the absorber temperature can rise beyond the point that permits functioning of the apparatus. To combat these extreme temperature excursions, high performance plastic films can be employed for absorber layer 24b that will change opacity in response to temperature, or light intensity, or both, thereby "shutting down" the apparatus, so to speak, or reducing solar absorptivity during these extreme worst case excursions.

Figure 7:
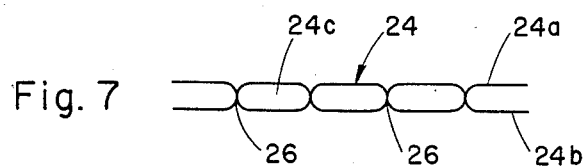
FIG. 7 is an exaggerated sectional view taken on line 7—7 of FIG. 5 and looking in the direction of the arrows to reveal the laminate construction of the absorber, and showing the spot-bonds with the separation between films, caused by the passage of fluid, shown greatly exaggerated, across the planar face thereof.
Figure 8:
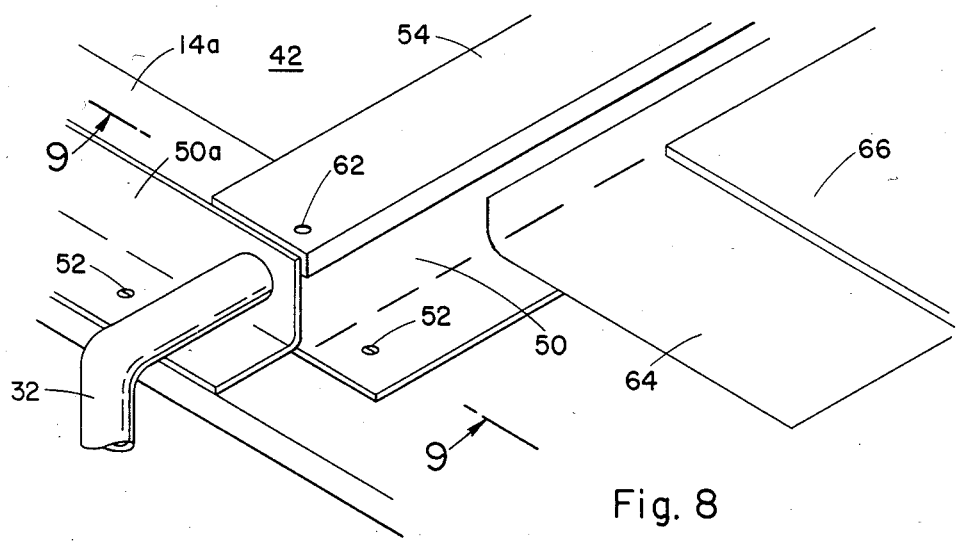
FIG. 8 is an enlarged fragmentary perspective view showing perimeter support structure for the collector and the manner of mounting the collector on a roof.

The perimetric planar edges of thin film layer 24a and 24b are bonded together to form a water-tight planar envelope 24c, as shown, for example, in FIG. 7. And, as seen best in FIGS. 2 and 7, a plurality of dimples or spot-bonds 26 are preferably placed across the planar face of absorber 24 in what amounts to a "patch quilt" configuration. Spot-bonds or dimples 26 provide a means for maintaining the dimensional stability of absorber 24 and thus define a plurality of localized point-regions where layers 24a and 24b join mechanically or fuse. With this construction, envelope 24c defines an essentially planar flowpath between the opposed closely spaced surfaces of layers 24a and 24b that exhibits good dimensional stability under flow conditions.

Alternatively, layers 24a and 24b may be bonded linearly so as to form channels. An adhesive 28, as shown, for example, in FIG. 5, such one of the known, high temperature, silicone based adhesives, is applied to the outboard surface of perimetric flats 16 that comprise one side or planar face of frame 14. Absorber 24, sized complementary to this planar face or perimeter, is then stretched taut and applied or pressed against adhesively coated flats 16 bonding the absorber to this one side of frame 14, as shown. Other bonding geometries, such as bonding films 24a and 24b to flats 16 under high-tension without the above mentioned bonds, are possible so long as they are capable of maintaining a high degree of parallelism between films 24a and 24b as fluid flows between them.

The critical aspect of designing absorber 24 is achieving minimum restriction of flow with a maximum of effective heat transfer surface. One way to assure this requires that films 24a and 24b be wetted over their full area. Preferably such full wetting is achieved by introducing the fluid at the top of collector 10 and allowing it to flow down through collector 24 under only the influence of gravity. This mode of operation will minimize the stresses on absorber 24 and will provide substantially full wetting when absorber 24 is formed by films having a nominal thickness of from 0.001 to 0.003 inches and assembled, as described above, so as to assure a high degree of parallelism between films 24a and 24b when fluid flows between them.

Alternatively, full wetting may be achieved by pumping fluid in at the bottom of collector 10. Using this mode of operation full wetting may be achieved even if somewhat thicker films are used to form absorber 24. However, then the surface must be able to tolerate static water pressure possibly equivalent to 10 ft of gravity head pressure. The dimpled envelope construction may meet this requirement provided the bonds are sufficiently strong and/or closely spaced. Ultrasonic welding of spot-bonds 26 should provide the needed strength.

Another preferred alternative, for the absorber is to use metal/plastic (e.g. polyester or polytetrafluoroethylene) laminate films for either the upper layer 24b or for both layers 24a and 24b of absorber 24. Preferably, the metal employed would be aluminum, and the plastic would be a fluorocarbon polymer such as polytetrafluoroehtylene. Such aluminum would, of course, be given a highly absorptive and preferably selective absorptive coating. The high heat transfer capacity of the aluminum would have the advantage of making full wetting of absorber 24 less crucial, since the formation of bubbles would not cause local heat build up.

Metal/plastic laminate absorbers, especially aluminum/plastic laminate absorbers, have a number of other advantages in comparison to absorbers formed from plastic alone. Since metal has good tensile strength and plastic has good tear resistance the metal/plastic laminate forms a strong, flexible, and tough thin film material. Thus, a preferred material for the absorber of the present invention is an aluminum/polytetrafluoroethylene laminate comprising a film of aluminum approximately 0.0005 to 0.002 inches thick, and preferably about 0.002 inches thick, bonded to a polytetrafluoroethylene film approximately 0.001 to 0.002 inches thick.

Further, since metals have a lower coefficient of thermal expansion than plastics, metal/plastic laminate absorbers will have improved dimensional stability. This improved stability, combined with the reduced need for full wetting, may reduce or eliminate the need for bonding between layers 24a and 24b.

Since metals provide a better substrate for the absorptive coating described above, absorber 24 would be formed with the metal layer outermost, that is as layer 24b. Thus, the inner layers of plastic, which are relatively chemically inert would protect the metal from chemical attack by the heat transfer fluid.

The absorptive coating described above might comprise a black paint on the outer, metal surface of upper layer 24b. In order to make such a coating selectively absorbtive, i.e., to make the absorptivity of sunlight substantially greater than the emissivity at the absorber operating temperature, the thickness of the absorptive coating must be closely controlled. One possibly superior way to do this would be to print the coating on the film using a gravure process.

It should be noted that while aluminum/plastic laminates are preferred, because of the high thermal conductivity of aluminum and its relatively low cost, other metals, such as copper or nickel, or any other metal from which a metal/plastic laminate can be formed, can be used in the absorber of the subject invention.

Means for manufacturing coated, aluminum/plastic laminates are well known in the plastics industry; such materials having been used, for example, in packaging.

Production of the absorber described above is easily adaptable to high-speed fabricating machines of the type now used in the food packaging industry to make plastic bags for potato chips and similar products, which laminate and print at a rate of hundreds of feet per minute. Manufacture of the absorber by such machinery is considered possible, including the entire process of laminating the films, printing the optically selective absorber surface and sealing the two films with the proper flow pattern.

An inlet manifold 30, and an outlet manifold 32 are placed at respective ends of frame 14, correspondingly, to provide an input and output path for the heat transfer fluid.

The material comprising the input and output manifolds should exhibit resistance to corrosion and compatability with thermal bonding techniques. Candidates for such a material include variations of polyvinylchloride, and stainless steel. As shown, inlet manifold 30 is disposed in the channel provided by frame member 14c, and outlet manifold 32 is disposed in the channel provided by complementary frame member 14d. Outlet manifold 32 is bonded to and thus rigidly fixed on the underside of flat 18. A plurality of apertures 34 are disposed in and through flat 18. A plurality of apertures 32a are disposed in outlet manifold 32. And, a plurality of output apertures 36 are disposed in absorber layer 24b and thus communicate with envelope 24c of absorber 24. It will be apparent that the respective apertures 32a in output manifold 32, the apertures 34 in perimetric flat 18, and the output apertures 36 of absorber layer 24b are in dimensional registration or align along a common axis to thereby allow the heat transfer fluid to egress the apparatus during operation of the invention as will be described below. Typically, the apertures just described for the egress of the heat transfer fluid are approximately 0.64 cm in diameter and they are placed on approximately 1.3 cm centers across flat 18 of member 14d.

In a manner similar to that described for outlet manifold 32, inlet manifold 30 is disposed in frame channel 14c. Inlet manifold 30 is likewise bonded to the underside of its respective flat 18. A plurality of apertures (not shown) are disposed in input manifold 30. A plurality of apertures 38 are disposed in and through flat 18 of frame member 14c. And, a plurality of input apertures 40 are disposed in absorber layer 24b, and thus communicate with planar envelope 24c. It will be apparent, too, that the apertures (not shown) of manifold 30, the apertures 36 of frame member 14c, and the input apertures 40 of absorber layer 24b are in dimensional registration such that the heat transfer fluid pumped into manifold 30 flows into the interior or absorber envelope 24c during operation of the invention as will be described shortly. Apertures 38 and 40 and the apertures (not shown) of manifold 30, are typically approximately 0.6 to 0.7 mm in diameter, and generally may be much smaller than the output apertures.

Two other methods of connecting manifolds 30 or 32 to absorber 24, which may prove to be more economical or otherwise advantageous, are also contemplated. In one of these methods manifolds 30 and 32 may be provided with a substantially flat, thin, hollow flange or projection, extending along the side of manifolds 30 or 32 co-extensively with absorber 24, and communicating with the interior of manifolds 30 or 32. Layers 24a and 24b may then be bonded by appropriate means to the upper and lower surfaces of the flat projection. Holes in the tip of the projection would allow the passage of heat transfer fluid into envelope 24c. Since the bonded portions of layers 24a and 24b would still be substantially in the plane of absorber 24, and since the bonds would not be exposed to the heat transfer fluid, it is expected that this method may provide a strong, leak-resistant bond between manifolds 30 and 32 and absorber 24.

In the other method contemplated, an extended portion of one of layers 24a or 24b, for example layer 24a, may be formed into a tube extending along one end of absorber 24. The extended portion of layer 24a is bonded to itself so that it retains the tube configuration, and the tube so formed is bonded to layer 24b. The extended portion of layer 24a is provided with apertures so positioned that when the tube is bonded to layer 24b the interior of the tube communicates with envelope 24c and the tube may be used in place of intake manifold 30.

A thin film plastic glazing or window 42, as shown in FIG. 5, is stretched taut and bonded to the other planar side of frame 14, that is, the planer side or face presented by flats 16. To accomplish this, an adhesive 44, similar to adhesive 28, is applied to the outboard planar face or surface presented by flats 16. Thin film glazing 42 is then placed in pressure engagement against adhesively coated flats 16 thereby perimetrically bonding the glazing to the frame. Glazing 42 is preferably comprised of a single thin film of plastic selected for its good radiative transmissibility and strength. Candidates for material comprising glazing 42 include ultraviolet stabilized polyesters having film thicknesses of from 0.004 to 0.011 inches (0.01 to 0.28 cm). For improved performance and weatherability, it might be desirable to include an anti-reflection surface on the outboard face of glazing 42, as well as adding anti-oxidants and anti-static agents to the glazing. The anti-static agents act to reduce accumulation of dust and debris on the surface of the film, and the anti-reflection feature of the glazing acts to increase the amount of solar energy admitted into the collector. Then, too, glazing 42 can be comprised of a material that will change opacity and thus radiative transmissibility during stagnant worst case temperature excursions. This kind of advanced window, working with a similarly constructed advanced absorber, acts to prevent a kind of thermal runaway and weakening of the collector during worst case excursions. Perimetrically bonded glazing 42, in conjunction with perimetrically bonded absorber 24, enclose a substantially sealed or dead air space 46 within frame 14.

Figure 9:
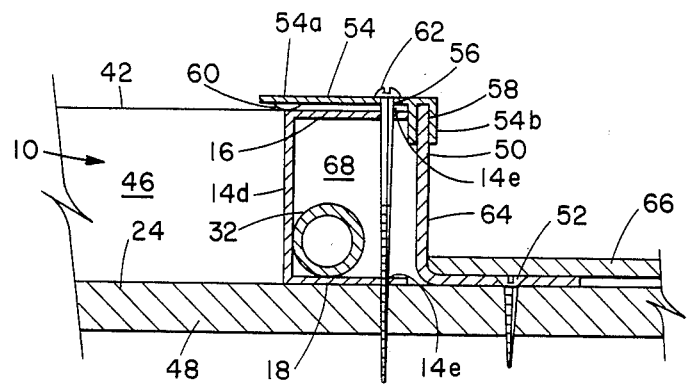
FIG. 9 is a side elevational view taken along the line 9—9 of FIG. 8 and looking in the direction of the arrows.
Figure 10:
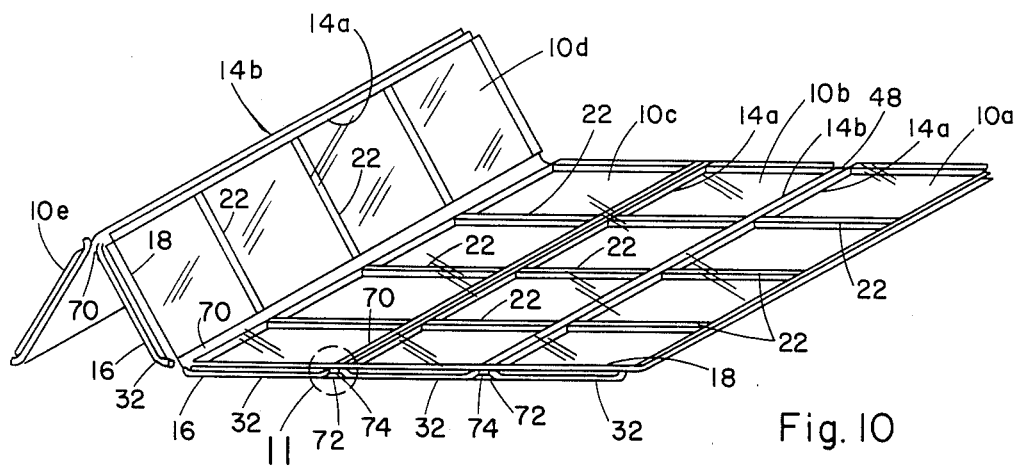
FIG. 10 is a perspective view of a hinged, five panel array of solar collectors according to the present invention, the array is seen being assembled, three of the panels have been placed in an operative planar configuration and they are in fluid communication by means of 0-ring couplings.

The collector typically is placed against an existing insulating planar surface 48, as shown, for example, in FIG. 10, with glazing 42 face-up or facing the sun. Collector 10 can be attached to surface 48 by conventional means. Alternatively, an L-bracket 50, as shown, for example in FIG. 9, coextensive with the length and height of complementary frame members 14c and 14d is fastened to surface 48 by means of a plurality of fastening elements 52, as shown, for example, in FIG. 9. As shown in FIG. 9, support bracket 54, having operatively placed apertures 56, is on one end, defined by a planar portion 54a, and on the other end, defined by a mini U-channel 54b, as shown. Collector 10, or more precisely, frame member 14d, is oriented so as to confront the upwardly extending inboard planar surface of bracket 50. A soft seal strip 58 is disposed along the outboard surface of glazing 42, and positioned thereon immediately over a portion of flat 16. And, a soft seal strip 60 is placed over the upwardly extending planar edge of L-bracket 50. Support bracket 54 is then placed over flat 16 such that mini U-channel 54b engages the exposed upwardly extending seal-covered planar edge of L-bracket 50, while at the same time causing planar portion 54a to engage seal 58. An elongate fastening member 62 is received in axially aligned apertures 56 and 14e. Member 62 drives bracket 54 firmly onto seals 58 and 60 compressing the same to thereby effect a relatively tight seal about the open end of member 14d. In addition, member 62 secures frame 14 onto surface 48. In like manner, although not shown separately, the open end of frame member 14c, carrying input pipe 30, is sealed and secured to surface 48.

The structure of L-bracket 50 readily lends itself to collector installation on a roof. If the collector is to be mounted on a roof, a layer of flashing 64 can be applied to and thus butt up against the outboard surface of bracket 50. Shingles 66 can then be applied as shown. For added efficiency, an insulating material 68, such as fiberglass or foam, can be interposed within the U-channel of each frame member 14c and 14d. Moreover, in certain applications it might be desirable to insulate or seal the U-channels of each frame member 14a and 14b from gross ambient temperature fluctuations. To accomplish this, correspondingly sized L-brackets 50a, as shown, for example, in FIG. 8, can be positioned against the outwardly projecting edges of flats 16 and 18 of the last-mentioned frame members to likewise seal their respective U-channels.

Enhanced operation may be obtained by insulating the U-channels that carry the input and output piping.

In opertion and use, frame 14, or more particularly, glazing 42 is disposed so as to face the sun. Water, or other suitable heat transfer fluid, is pumped into inlet manifold 30 and thus flows into planar envelope 24c defined by thin film planar layers 24a and 24b. Owing to the unique construction of thin-film absorber 24, a particular orientation of inlet manifold 30 relative to outlet manifold 32 is not essential. That is, inlet manifold 30 can be above, below, or level with, outlet manifold 32 because, as the heat transfer fluid flows through envelope 24c, the method of assembly and thinness of film layers 24a and 24b assures substantially full wetting of same even without pressurization of the fluid within envelope 24c. However, as described above a gravity (trickle) fed mode is preferred. As the heat transfer fluid passes through absorber envelope 24c, it is heated therein eventually to be collected in outlet manifold 32 for distribution.

Owing to the relatively large surface area presented by the thin film planar faces of collector 10, the wind loading on the collector and frame can reach high levels. This tends to distort the glazing with possible increase in material failure. Cross-struts 20 reduce this tendency by adding to the overall rigidity of frame 14 and reducing the surface-to-bonding area ratio. Moreover, as noted above, both glazing 42 and absorber 24 are applied to respective sides of frame 14 in a stressed state. This perimetric "skin tight" or monocoque construction also adds to the overall strength of the collector.

Figure 11:
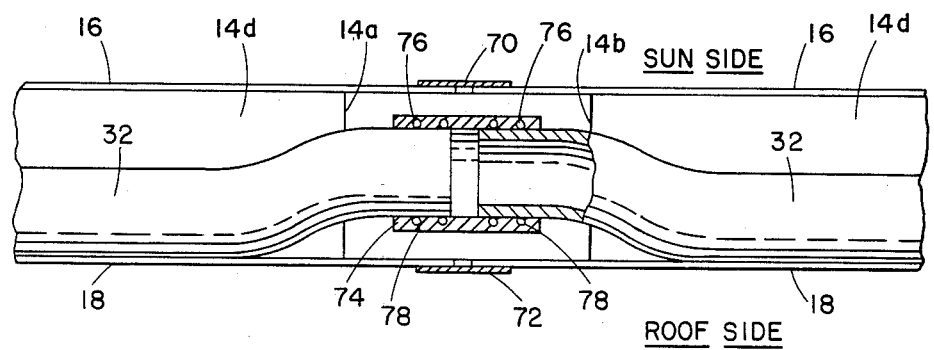
FIG. 11 is a fragmentary sectional view drawn on an enlarged scale showing that portion indicated as 11 in FIG. 10 to reveal the structure of the 0-ring coupling.

Depending on the capacity of the system to which it is attached, it might be desirable to "gang" or provide for an array or ensemble of solar collectors. Turning now to FIGS. 10, 11, and 12, there is shown an assembly of such panels, ganged, for added capacity by means of appropriate fluid couplings. The ensemble comprises a plurality of panels or collectors 10a, 10b, 10c, 10d, and 10e each constructed, more or less, identical to collector 10 described with reference to FIGS. 1 through 9. However, to facilitate the installation or possible repair, certain additions are included in the embodiment of FIGS. 10, 11 and 12. A thin film plastic hinge strip 70 is bonded to a narrow strip along the planar outboard face presented by adjacent frame members 14a and 14b of respective contiguous panels. As seen in FIG. 10, hinge strips 70 are applied along alternate "upper" and "lower" co-planar edge-faces thus hinging alternate surfaces of the panels. Hence, in one instance, alternate adjacent "bottom side" absorber edges overlying respective flats 18 of opposed members 14a and 14b are bonded by hinge strips 70, while in another instance, alternate adjacent "top side" glazing edges overlying respective flats 16 of opposed members 14a and 14b are bonded by a hinge 70. In practice hinge 70 is merely an elongate piece of thin film of the type used in, for example, glazing 42, and, by means of the aforesaid alternate disposition of the hinges, the panels are able to fold accordion-like for installation, and can extend planar-like in operation.

At the site of installation, and preparatory to operation and use, the panels are positioned and locked in planar array in accordance with the following construction. Those alternate "top-side" and "bottom side" planar edges of adjacent panels which were not joined by a hinge strip 70, are now joined by a thin film "hinge" strip 72. Hinge piece 72 is complementary in size and composition to hinge 70, and it is adhesively bonded to a narrow strip along the outboard surface of adjacent flat-pairs 16 and flat-pairs 18 of respective opposed frame members 14a and 14b, in a manner similar to that described for hinge piece 70.

An 0-ring coupling comprised of a tubular or cylindrical coupling member 74, and a plurality of internally carried parallel spaced 0-rings 76, provide for the facilitated liquid-tight interconnection of adjacent manifolds when the panel assembly is disposed in its planar operative disposition. A plurality of spaced 0-ring seats 78 are formed within coupling member 74, as shown. The inside diameter or cross-sectional area of member 74 is complementary in size to the outside diameter or perimetric configuration of a corresponding section of pipe 30 or 32 about which it respectively engages. 0-rings 76 are likewise sized complementary to the outside perimetric configuration of manifolds 30 and 32. The 0-rings are caused to engage tightly the corresponding peripheries of associated manifolds, due to the appropriate dimensionality of 0-ring seats 78. Owing to the complementary internal shape of a given coupling in relation to its respective pipe section, the couplings merely slip-on to respective adjacent manifolds, and thus require a minimal amount of labor. The frictional 0-ring sealing afforded by couplings 74 readily accomodates the thermal flexing and relative movement of one panel and manifolding relative to another.

Operation and use of the embodiment shown in FIGS. 10, 11, and 12 is substantially similar to that described with reference to the embodiment in FIGS. 1 through 9, and so it need not be discussed in detail here. Suffice it to say, however, that the water or heat transfer fluid that flows into ganged input manifolds 30 is distributed among all panels to be heated respectively therein, eventually to be collected in ganged outlet manifolds 32 for distribution. The confronting U-channels of adjacently placed frames in the array defines a dead air-space between panels that adds to the overall thermal efficiency of the ensemble.

Turning now to FIGS. 13 and 14 there is shown one more embodiment of a solar collector according to the present invention employing a double-glazed or double window construction for added efficiency. In FIGS. 13 and 14, the double-glazed collector is indicated generally by reference numeral 210 and, as is readily apparent when comparison is made of the last mentioned figures to FIGS. 1 through 9, a second thin film window or glazing 80 is added to collector 10. More particularly, a rigid perimetric planar frame 214, as shown in FIG. 14, complementary in size to frame 14 is, as is frame 14, comprised of rigid members that are, in transverse cross-section, preferably U-channeled or U-shaped. Thus, the respective frame members, one of which, 214d, is shown in cross-section in FIG. 13, are defined by spaced parallel perimetric flats 216 and 218. Glazing of window 80, similar to glazing 42, is stretched across and bonded to the outboard perimetric planar face presented by flats 216. The outboard planar perimetric face presented by flats 218 is then bonded to the upper planar perimetric face presented by glazing 42 and flats 16 thereby orienting window 80 spaced from and parallel opposed to window 42. The two coplanar windows thus define a dead air space 82 between them. It will be apparent when viewing FIGS. 13 and 14 that the members of frame 214 are in dimensional correspondence with the respective members of frame 14. The width of the U-channel of frame 214, or the distance between flats 216 and 218 is not of critical importance. However, depending on such factors as the transmissibility of windows 80 and 42, the ambient temperature, and the heat transfer characteristics of frames 14 and 214, the distance between windows 80 and 42 will affect performance and should be chosen to minimize convective loses. Depending on the size of the U-channel comprising frame members 14, and this is discussed below, a good choice for the height of the U-channel of each member of frame 214 is approximately 1 cm. Hence, windows 80 and 42 are likewise separated by a distance of approximately 1 cm.

In operation and use of collector 210, discussed below, the collector is mounted typically on a roof according to the following construction. A rigid or semi-rigid insulating material such as polymer foams, foam, or the like is sized complementary to the planar face presented by frame 214 and placed on roof 86. An L-bracket 250, similar in construction to L-bracket 50 of FIG. 9, is fastened to surface 86 by means of fastening members 252. A support bracket 254, is, on one end, defined by a planar land 254a, and on the other end, defined by a mini U-channel 254b, as shown. Short seal strips 258 and 260 are disposed as shown. Bracket 250 is then placed over flat 216 such that mini U-channel 254b engages the upwardly extending seal-covered planar edge of L-bracket 250, while at the same time causing planar land 254a to engage seal 258. An elongate fastening element 262 concomitantly is received through apertures 256 of bracket 254, apertures 214e of flats 216 and 218, and apertures 14e of flats 16 and 18, eventually to be received in roof 86. As fastening member 262 is tightened into roof 86, it compressively loads seals 258 and 260 effecting a tight seal about the open ends of frame members 14d and 214d, as well as securing frames 14 and 214 to the roof. A layer of flashing 264 can be applied to and thus butt up against the outboard surface of L-bracket 250. Shingles 266 can then be applied as shown.

Operation and use of collector 210 is generally similar to that described with reference to collector 10 of FIGS. 1 through 9. It will be apparent, however, that the air in space 82 is heated, as is the air in space 46. The heating of both air spaces 82 and 46 adds to the overall efficiency of the collector, and thus the double-glazed construction of collector 210 adds to the temperature rise of the fluid flowing through absorber 24 when compared to a single-glazed construction.

FIG. 14 shows the double-glazed collector of FIG. 13 being ganged for added capacity by using substantially the same techniques shown in FIGS. 10, 11, and 12, and so it need not be discussed in detail here. However, it will be apparent that the double-glazed construction of collector 210 requires that respective thin film hinges 70 and 72 bond alternate perimetric co-planar edge-pairs presented by adjacent absorber perimeters, as the case may be.

Operation and use of the embodiment of FIG. 14 is substantially similar to the manner of operation described with reference to FIG. 13, the major difference being that the resultant capacity is increased. Respective manifolds 30 and 32 are in fluid communication by means of fluid tight couplings 74, described above.

Figure 15:
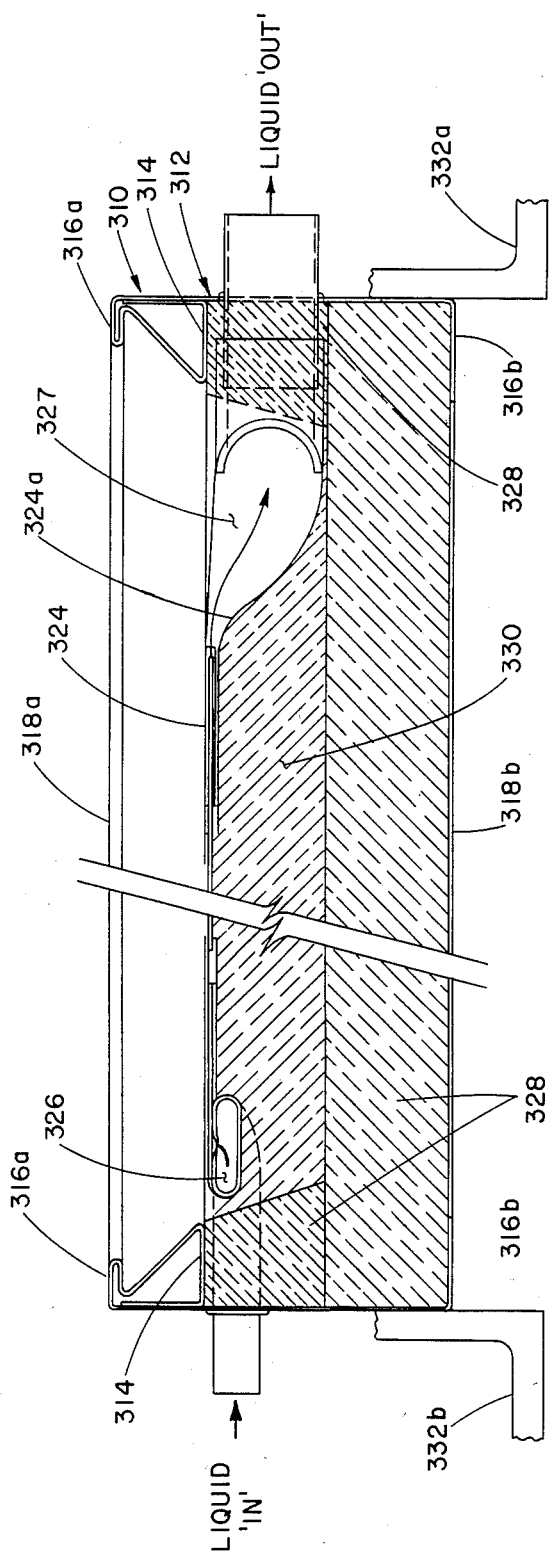
FIG. 15 is a section view, taken along the long axis, of a modified preferred collector comprising the absorber of the present invention and suitable for high temperature operation.

Turning to FIG. 15, there is shown a preferred collector 310 comprising the absorber of the present invention. Collector 310 is particularly adapted for high temperature operations such as are needed for direct space heating. Collector 310 comprises a rectangular frame 312 which further comprises an internal perimetric flange 314 and perimetric planar surfaces 316a and 316b. Glazing 318a and 318b is tautly bonded to planar surfaces 316a and 316b respectively to form a monocoque structure with frame 312. Preferably, glazing 318a and 318b will overlap the sides of frame 312 somewhat. Alternatively, a seamless tube of heat-shrinkable clean plastic may be slipped over frame 312 and shrunk taut to provide glazing and form a monocoque structure. [The term "glazing" is used herein, since the same material may conveniently be used for both "glazing" 318a and 318b. However, it is obvious that only upper glazing 318a need have the optical properties normally connoted by the term "glazing".]

Within frame 312 absorber 324 is bonded to flange 314 approximately ⅜ inches below glazing 318a. It should be noted that while absorber 324 is tautly bonded to flange 314, it is not intended to provide significant structural support to collector 312, rather this support is provided by additional glazing 318b.

Absorber 324 is bonded to input manifold 326 and output manifold 328 is formed from extended layer 324a of absorber 324 in the manner described above.

Insulation is provided between absorber 324 and glazing 318b. The insulation comprises a rigid foam insulating member 328, which structuraly supports frame 312 in compression and fiber insulation 330 directly beneath absorber 324. Fiber insulation 330 is provided to shield insulation 328 from absorber 324 temperatures, which may reach 400° F.

Because of the interaction between tautly bonded glazing 318a and 318b, frame 312 and rigid insulation 328, which cooperate to form a strong monocoque structure, frame 312 may be made from sheet metal as thin as 0.010 inches and may be easily shaped by cold rolling. It should also be noted that because the material used for frame 312 may be easily formed by cold rolling, planar surface 316a and flange 314 may be formed as an integral part of frame 312 and that when so formed flange 314 serves as a brace for that portion of frame 312 not supported by insulation 328.

Collector 310 may be mounted using legs (332a and 332b) or other conventional mounting means. In general, installation and operation of collector 310 is substantially similar to that of the other collector embodiments described above.

The advanced, thin film structure of the present collector suggests operational modes in addition to heat generation. For example, it appears feasible to carry forward the thin film structure of the present invention to adaptation and application with photovoltaic layers. Suitable substrates may be incorporated with the plastic films for deposition or "printing" of the proper photoelectric amorphous semiconductor material. The appropriate electrical connection may be integrated into conductive layers on the plastic support film and semiconductor. Such composition applied to the absorber could result in a simple solar collector structure capable of generating both thermal and electrical energy. A photovoltaic layer may also be included in the glazing film layer as well.

In practice, good results are obtained when complementary frame elements 14a and 14b are approximately 7.5 feet (2.3 m) long, complementary frame elements 14c and 14d are approximately 2.75 feet (0.84 m) long, and the U-channel stock comprising these elements is approximately 1⅜ inches (3.5 cm) wide, or, stating this last mentioned dimension another way, surface 16 and surface 18 are separated by a distance of approximately 1⅜ inches (3.5 cm). This construction provides for a nominal flow-rate of approximately ½ gallon (1.9 liters) per minute, and yields an envelope pressure of less than 1/10 psi.

While only a few embodiments of the present invention have been shown and described, it is to be understood that many changes and modifications can be made hereto without departing from the spirit and scope hereof. In particular, it will be apparent to those skilled in the art that the absorber of the present invention may be used as a heat exchanger apart from any solar collector, as for example, as a space heater.

EXAMPLE I

A low cost, relatively low performance collector, suitable for use with a solar assisted heat pump, may be made essentially as illustrated in FIG. 1 using the following materials.

Layers 24a and 24b are formed by polyester film that is 0.001 inches thick which is bonded to aluminum which is 0.002 inches thick, said aluminum being coated so as to have an absorptivity, $\alpha$, of approximately 0.95.

Glazing 42 is formed of ultra-violet stabilized polyester having a transmissivity, $\tau$, of approximately 0.86.

Insulation having an R value of approximately 5 is provided to reduce heat loss from the collector.

The collector will operate in a "trickle" mode and absorber 24 will require minimal or no bonding between layers.

EXAMPLE II

A moderately higher cost, high performance collector, suitable for direct heating, may be made essentially as illustrated in FIG. 13 using the following materials.

Absorber 24 is formed from two layers of 0.001" polytetrafluoroethylene bonded to aluminum which is 0.002 inches thick and which has been coated so as to have an absorptivity, $\alpha$, of 0.95.

First glazing 80 is formed from a 0.003" film of oriented polyvinylidene fluoride (and preferably from the material sold under the Trademark "Kynar"), and has a transmissivity, $\tau$, of approximately 0.93.

Second glazing 42 is formed from a film of 0.001" polytetrafluoroethylene (and preferably from the material sold under the Trademark "Teflon FEP") and has a transmissivity of approximately 0.96.

Insulation having an R value of approximately 5 is provided to reduce heat loss from the collector.

The collector will operate in a "trickle" mode and absorber 24 would require minimal or no bonding between layers.

I claim:
1. A solar collector comprising:
   (a) a perimetric frame defining a substantially open central portion having two spaced, substantially planar sides, said frame also having an internal perimetric flange;
   (b) thin plastic film glazing substantially congruent to said frame covering said sides and fastened to said frame whereby said frame and said glazing cooper- ate to form a light-weight, high-strength monocoque structure;

(c) an absorber comprising two substantially congruent thin films being bonded together around their edges to form an envelope having a high surface area to volume ratio, said envelope having a first opening for the introduction of a heat transfer fluid into said envelope and a second opening for the removal of said fluid from said envelope, which absorber is substantially congruent with and fastened to said internal flange so that said absorber is parallel with and spaced from said sides; and (d) manifold means for providing a flow of heat transfer fluid through said absorber.

2. A collector as described in claim 1, further comprising insulation disposed between said absorber and at least one glazing film said sides defined by said frame, at least a portion of said insulation comprising a rigid insulation material which supports said frame in compression so as to further strengthen said monocoque structure.

3. A solar collector of claim 1 wheein the absorber is constructed so that said films are furthe bonded together at a plurality of locations across their surface so as to maintain a high degree of parallelism between said films as said heat transfer fluid flows from said first opening to said second opening thereby assuring that a substantial portion of the surface of said films is wetted by said fluid.

4. A solar collector of claim 1 wherein in the absorber, at least one of said films is formed from a metal/plastic laminate.

* * * * *